E. M. REA & E. A. OLDEN.
INSECT DESTROYER.
APPLICATION FILED FEB. 21, 1911.
1,012,437.
Patented Dec. 19, 1911.
3 SHEETS—SHEET 3.
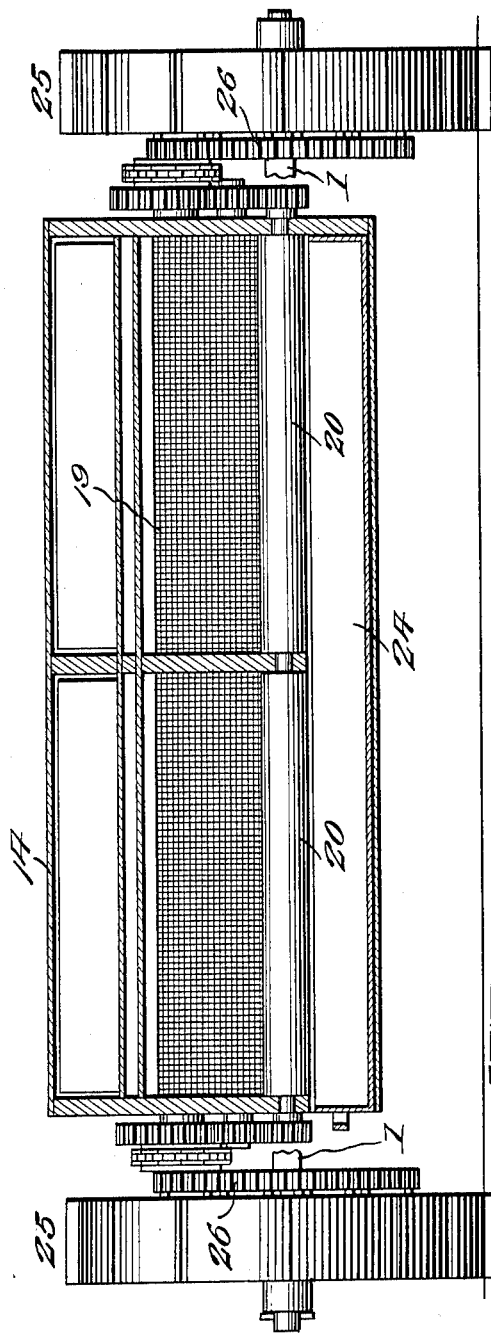
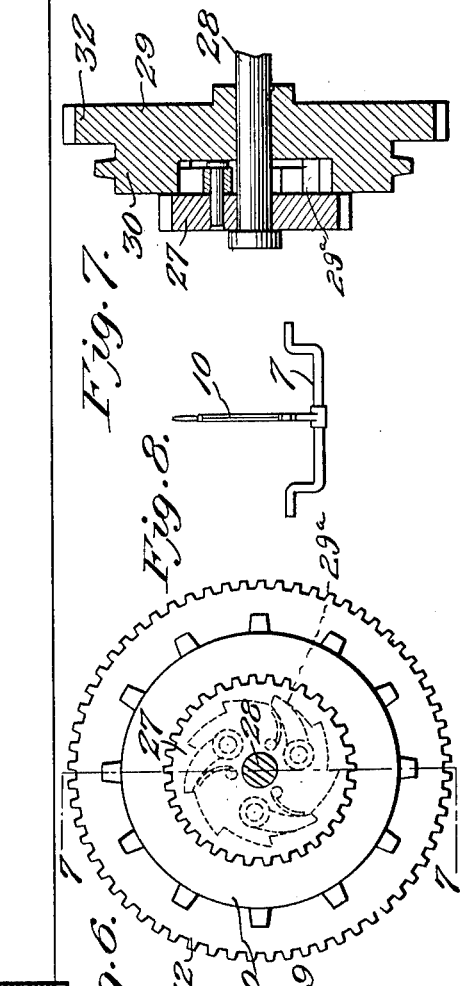
Witnesses
Edwin G. McKee
V. B. Hillyard.
Inventors
Edward M. Rea
Emory A. Olden
By Victor J. Evans
Attorney

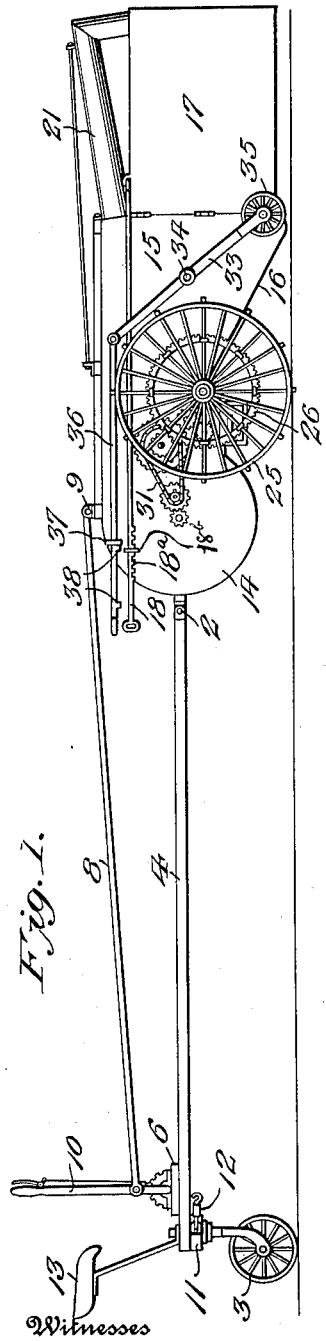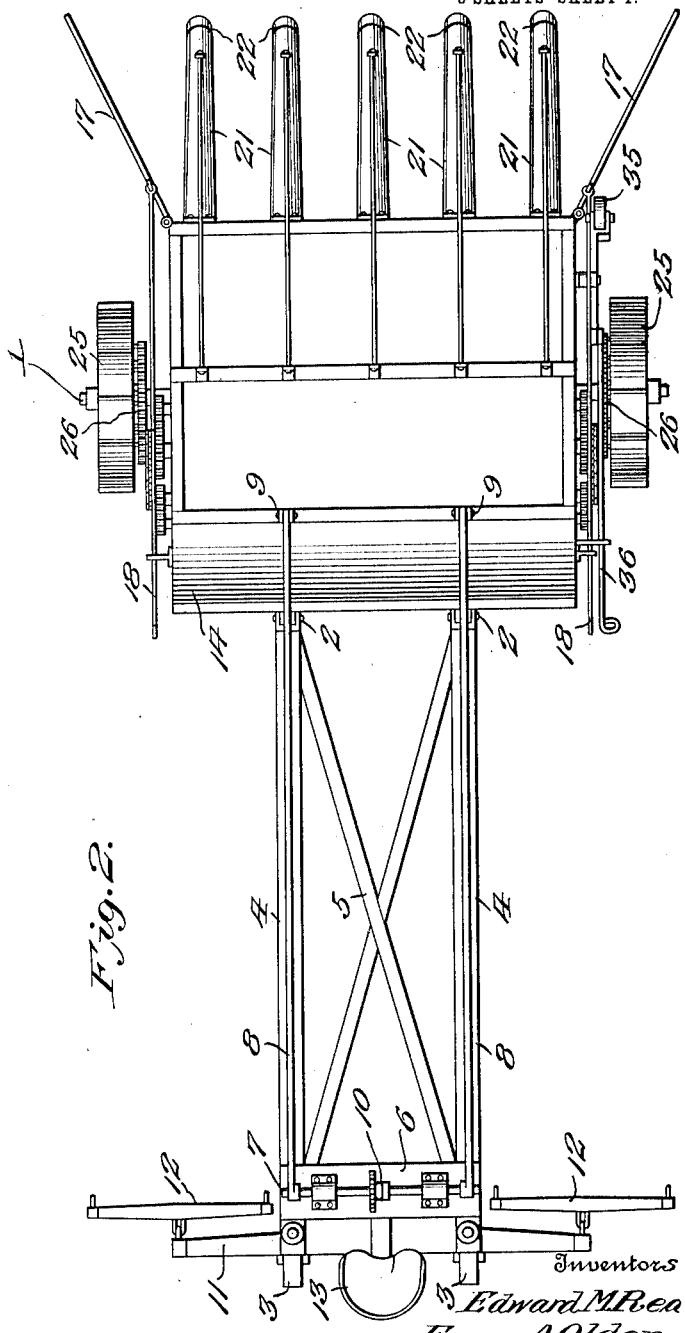

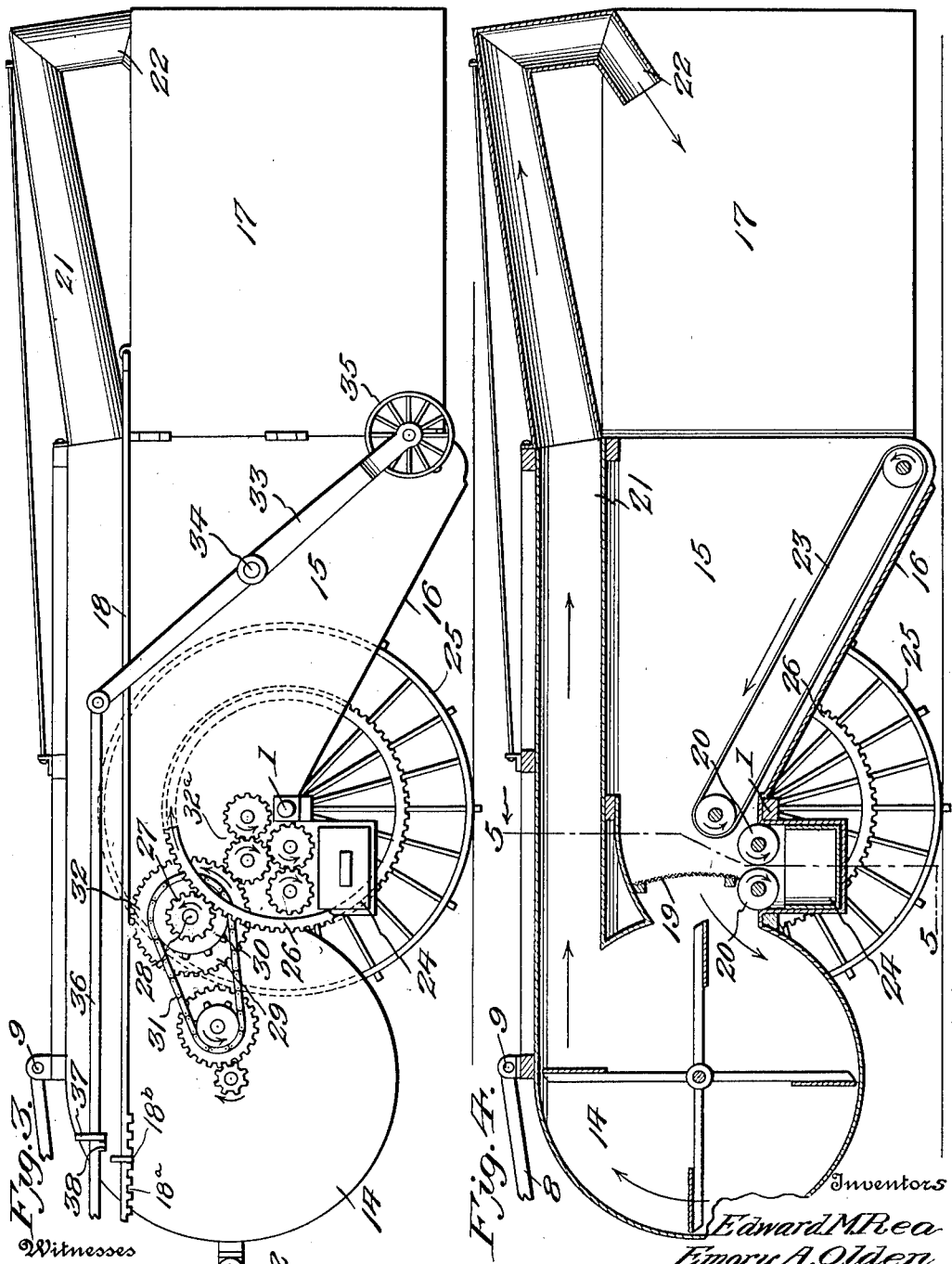

UNITED STATES PATENT OFFICE.

EDWARD M. REA AND EMORY A. OLDEN, OF ZITA, COLORADO.

INSECT-DESTROYER.

1,012,437.
Specification of Letters Patent.
Patented Dec. 19, 1911.

Application filed February 21, 1911. Serial No. 609,890.

*To all whom it may concern:*

Be it known that we, EDWARD M. REA and EMORY A. OLDEN, citizens of the United States, residing at Zita, in the county of Weld and State of Colorado, have invented new and useful Improvements in Insect-Destroyers, of which the following is a specification.

This invention provides a machine for exterminating insects and at the same time collecting the remains to be subsequently used for food.

The primary purpose of the invention is the provision of a machine to be propelled over the field infested with grasshoppers for catching and killing the insects without crushing them to such extent as to prevent their subsequent use for feed for poultry or other stock, said machine embodying a draft creating device, an elevator, compressing rolls for killing the insects by partly crushing the same, and a receptacle for receiving the remains of the insects, which latter are subsequently dried and used as feed.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of a machine embodying the invention. Fig. 2 is a top plan view thereof. Fig. 3 is a side view of the front portion of the machine having the draft frame detached. Fig. 4 is a vertical central longitudinal section of the forward portion of the machine. Fig. 5 is a transverse section on the line 5—5 of Fig. 4. Fig. 6 is a view in elevation of the power transmitting gear. Fig. 7 is a section on the line 7—7 of Fig. 6. Fig. 8 is a detail view of the crank shaft for adjusting the machine upon the axle to raise or lower the front portion thereof.

Corresponding and like parts are referred to in the following description, and indicated in all the views of the drawings, by the same reference characters.

The machine comprises a main frame which is mounted upon an axle 1 and a draft frame pivotally connected with the main frame at 2 and supported at its rear end upon a caster wheel 3. The draft frame comprises longitudinal bars 4, a cross brace 5, and a platform 6, the latter serving to connect the rear ends of the longitudinal bars 4 and in turn supporting a crank shaft 7, the crank arms of which are connected by rods 8 with the main frame at 9. An operating lever 10 is connected to the crank shaft and provides convenient means for turning the same in its bearings, whereby the front portion of the machine may be raised or lowered to any distance from the surface of the ground within the range of adjustment thereof. A cross bar 11 is secured to the rear ends of the longitudinal bars 4 and acts in the capacity of a doubletree and is provided at its ends with singletrees 12 to which the horses are attached for propelling the machine over the field. The driver's seat 13 has its standard secured to the cross bar 11. By having the draft frame pivotally connected to the main frame, which latter is secured to the axle 1, and by having the rod 8 pivotally connected to the main frame and connected to the crank arms of the crank shaft 7 said main frame may be turned upon the axle so as to raise or lower its forward end, the adjustment being effected by means of the lever 10 in the manner stated.

The main frame comprises a fan casing 14 and a box-like structure 15 whose bottom inclines upwardly and rearwardly, as indicated at 16. The box-like structure 15 is open at its front and wings 17 are hinged to the front ends of its side walls and are adapted to be swung laterally at their front ends so as to increase the spread or track to gather in the insects at the sides of the machine. The wings 17 may be spread at their forward ends to any angle and are secured in the adjusted position by means of rods 18, which are provided near their rear ends with a series of teeth 18$^a$ to engage keepers 18$^b$. The wings 17 serve to gather and direct the insects at the sides of the machine into the open end of the box structure 15. The fan casing is open at its front side and communicates with the rear contracted end of the box structure 15, a screen 19 being located at the passage between the parts 14 and 15 so as to arrest the rearward movement of the insects and cause the same to fall between the compressing rolls 20. A plurality of spouts 21 communicate with the upper portion of the fan casing 14 and extend forwardly and terminate in downwardly and rearwardly extending nozzles 22, which deliver blasts of air in a downward and rearward direction so as to cause the insects to pass rearwardly into the machine where they are destroyed and collected. An endless apron 23 is located above the inclined bottom 16 and inclines upwardly and rearwardly and is driven so that its upper portion travels upwardly and rearwardly, thereby carrying the insects alighting thereon toward the compressing rolls which crush out their life without rendering them unfit for feed. It is noted that by having the fan located at the rear of the box-like structure 15 it serves the double purpose of creating a rearward suction through the said structure and a forward blast through the spouts 21, said blast being rearwardly directed by the nozzles, thereby increasing the current of air passing through the structure 15. The compressing rolls 20 are located below the delivery end of the endless apron 23 and below the screen 19 and are spaced apart a distance to compress the insects sufficiently to destroy their life without reducing them to a shapeless mass. A box 24 is located below the compressing rolls and extends the full width of the machine and is adapted to receive the insects as the same accumulate, said box being removed from time to time to admit of dumping the insects therefrom.

The fan, endless apron and compressing rolls are operated by suitable gearing substantially as indicated in the several views. Drive wheels 25 are fitted to the arms or spindles of the axle and are provided with toothed rims 26, which mesh into the teeth of pinions 27 mounted loosely upon stub shafts 28. A twin gear 29 is loosely mounted upon each stub shaft 28 and is connected with the adjacent pinion 27 by means of a ratchet mechanism 29ª, as shown most clearly in Figs. 6 and 7. The fan is operated from the sprocket member 30 of the twin gear by means of a sprocket chain 31 and intermediate gearing and the endless apron and compressing rolls are operated from the cog gear member 32 of the twin gear by means of spur gearing 32ª, the several part being driven in the directions indicated by the arrows in Figs. 3 and 4. In the compact structure of the machine the box or receptacle 24 is located adjacent the axle 1 and comes between the drive wheels 25 and in order to remove the box when it is required to empty the same it is necessary to remove one of the drive wheels and during the time that the drive wheel is removed it is necessary to support the machine upon the side from which the drive wheel is removed and for this purpose a bar 33 is pivoted to the frame at 34 and is provided at its lower end with a ground wheel 35, said bar being adapted to be actuated by means of a bar 36 pivoted to the upper end thereof and arranged to operate through a keeper 37, said bar 36 having stops 38 to engage with the keeper 37 to hold the bar 33 in the desired position. Preliminary to removing the wheel the bar 36 is moved forward, thereby turning the bar 33 to bring the wheel 35 in contact with the ground when a slight forward movement of the machine will lift the drive wheel to be removed clear of the ground, the bar 33 assuming a vertical position. After the draw box or receptacle 24 has been removed emptied and replaced the drive wheel is slipped upon the axle and made secure and the machine backed, thereby permitting the drive wheel to rest upon the ground and the lower end of the bar 33 to be thrown forward when it is made secure by engaging a stop of the bar 36 with the keeper 37.

In the operation of the machine it is propelled over the ground infested with insects and as the machine proceeds the insects pass between the wings 17 and under the overhanging portion of the frame, after which the insects becoming frightened rise and are carried rearward by the air currents, their rearward movement being facilitated by the traveling apron 23 and the insects striking the screen 19 drop between the compressing rolls 20, which crush out their life, the remains dropping into the receptacle 24. The side wings 17 serve to confine the insects and also to prevent side drafts or air currents interfering with the successful operation of the machine.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claims appended hereto.

Having thus described the invention what is claimed as new, is:—

1. In an insect destroyer, the combination of a main frame comprising a box-like structure open at its front and having its bottom upwardly and rearwardly inclined, a fan located in the rear of the box-like structure, a screen located in the passage connecting the fan casing and box-like structure, compressing rolls arranged below the screen, and spouts extending from the fan casing and extending over the box-like structure forwardly thereof and terminating in downwardly and rearwardly inclined nozzles.

2. In a machine of the character described, the combination of a box-like structure having its bottom upwardly and rearwardly inclined, a fan located in the rear of the box-like structure and communicating therewith, a screen located in the passage between the fan casing and box-like structure, compressing rolls located below the screen, air spouts extending from the fan casing over the box-like structure forwardly thereof and terminating in rearwardly and downwardly extending nozzles, and an endless apron arranged over the inclined bottom of the box-like structure.

In testimony whereof we affix our signatures in presence of two witnesses.

EDWARD M. REA.
EMORY A. OLDEN.

Witnesses:
HENRY W. McGILP,
CHARLIE E. OLDEN.

Copies of this patent may be obtained for five cents each, by addressing the "Commissioner of Patents, Washington, D. C."